Oct. 17, 1939.                C. K. STILLWAGON              2,176,281
                         COMBINATION PISTON AND ROD
                            Filed Sept. 18, 1937
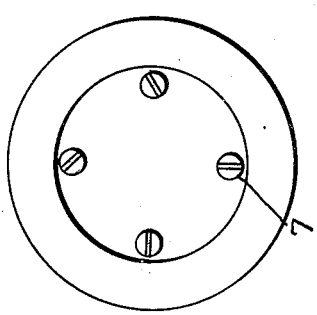
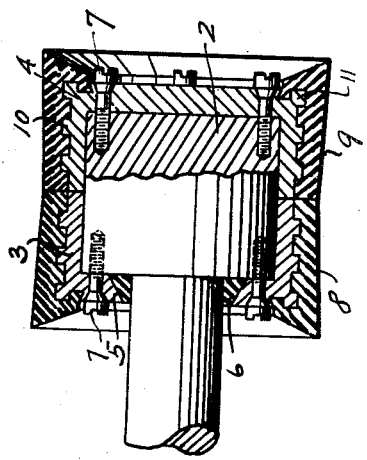
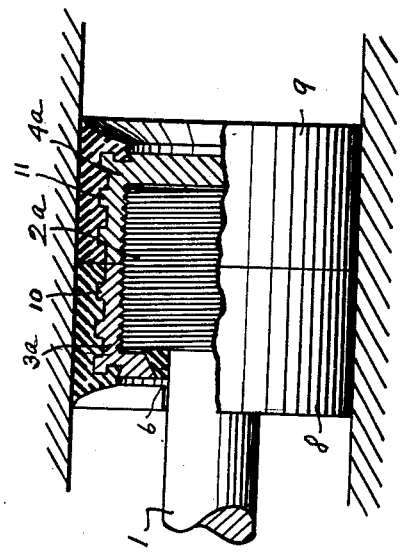
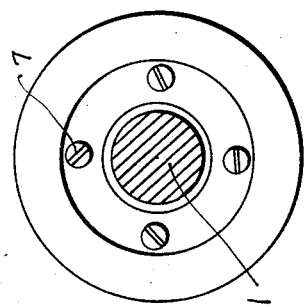
Inventor
Crawford K. Stillwagon
By Edward V. Hardway,
                Attorney Patented Oct. 17, 1939

2,176,281

UNITED STATES PATENT OFFICE 2,176,281

COMBINATION PISTON AND ROD

Crawford K. Stillwagon, Houston, Tex.

Application September 18, 1937, Serial No. 164,453

15 Claims. (Cl. 309—15)

This invention relates to a combination piston and rod.

An object of the invention is to provide a novel type of piston rod.

Another object of the invention is to provide a novel type of piston.

It is a further object of the invention to provide a novel assembly of piston rod and piston.

A still further feature of the invention resides in the provision of a sectional type of piston with novel means for securing the piston to the piston rod.

With the above and other objects in view the invention has particular relation to certain novel features of construction, arrangement of parts and use, an example of which is given in this specification and illustrated in the accompanying drawing wherein:

Figure 1 shows a longitudinal sectional view showing the complete assembly.

Figure 2 shows an end view of the piston showing the rod in section.

Figure 3 shows a forward end view of the piston, and

Figure 4 shows a side view, partly in section, of another modification shown located in a pump cylinder.

Referring now more particularly to the drawing wherein like numerals of reference designate the same parts in each of the figures, the numeral 1 designates a piston rod having an enlarged head 2 at one end thereof preferably formed integrally therewith. This head is preferably cylindrical in shape. The piston body is shell-like in form and is composed of cup-shaped sections 3 and 4 which are fitted over the respective ends of the head 2 and whose margins abut. The section 3 has a bearing 5 through which the piston rod 1 is fitted and said rod is surrounded by suitable packing 6 to prevent the entrance of grit. The outer end of the section 4 is solid, as shown in Figure 2. The sections 3 and 4 are fastened to the head 2 in any suitable manner preferably by set screws 7 which are fitted through suitable openings in the ends of the sections 3 and 4 and are screwed into the head. The heads of these set screws are tapered, as shown, and are countersunk into correspondingly shaped recesses in the ends of the sections 3 and 4. The piston shell, or body, is thus securely fastened to the piston rod.

As illustrated in Figure 4 there is the enlarged outwardly threaded head 2a formed integrally with the piston rod 1 and the sections 3a, 4a are screwed onto opposite ends of the head. In other respects the embodiment shown in Figure 4 is the same as that shown in the other figures.

Before installing the sections on the head 2 they are covered with rubber covering as 8, 9 suitably contoured to fit within the cylinder in which the piston is to operate. Their ends may be flared as shown in Figure 2. The sections 3 and 4 have external projections 10, 11 thereon, as shown, preferably in the form of annular ribs about which the rubber is molded. That portion of the rubber adjacent the metal sections is hard and the external portion of the rubber is preferably of soft rubber so as to readily conform to the contour of the cylinder liner and to have better wearing qualities.

From the foregoing it is obvious that the piston can be quickly installed on the rod and when once installed will be securely anchored to the rod. It is further obvious that the piston can be readily dismembered and new parts substituted for the parts that have become worn out.

The drawing and description disclose what is now considered to be a preferred form of the invention by way of illustration only, while the broad principle of the invention will be defined by the appended claims.

What I claim is:

1. The combination with a piston rod having an end head formed thereon, of a piston formed of cup-shaped sections formed of rigid material and fitted over the respective ends of the head and through one end of which the rod extends and means for securing the sections to the head.

2. The combination with a piston rod having a cylindrical end head of a piston composed of two sections surrounding and completely enclosing and secured to said head.

3. The combination with a piston rod having a cylindrical head of a metal piston fitted closely around, and completely enclosing the head and secured thereto.

4. The combination with a piston rod having a head formed thereon of a piston fitted closely around the head and secured thereto, said piston being formed of independent cup shaped sections fitted over the ends of the head.

5. The combination with a piston rod having a head, of a piston fitted closely around the head and secured thereto, said piston being formed with an inner, sectional, rigid shell secured to the head and a resilient covering for the shell.

6. A piston formed of approximately similar cup-shaped sections having confronting margins which abut, a resilient covering for each section and means for securing the sections in assembled relation with the head to form a complete piston.

7. The combination with a piston rod having an approximately cylindrical head, cup-shaped sections of rigid material fitted over the ends of the head with their margins in abutting relation, means for securing said sections to the head, each section having an outer resilient covering therearound and packing around the rod and between it and the head.

8. The combination with a piston rod having its end enlarged, said enlarged portion being cylindrical and formed integrally with the rod and a piston completely around, and secured to the rod by, said enlarged portion.

9. The combination with a piston rod having an enlarged head formed integrally therewith, a sectional piston, said sections being screwed onto, and connected to the rod by, said head.

10. The combination with a piston rod having an approximately cylindrical enlarged head on one end thereof, approximately cup-shaped sections of rigid material fitting over the ends of the heads with their confronting margins in abutting relation, means for securing said sections to the head, said rod extending through one of said sections, means forming a seal between said rod and the section through which it extends and a resilient covering for each section.

11. The combination with a piston rod having an approximately cylindrical enlarged head on one end thereof, approximately cup-shaped sections of rigid material fitting over opposite ends of the head with their confronting margins in abutting relation, means for securing the sections to the head, said rod extending through one of said sections, said last-mentioned section having an outwardly tapering bearing and a seal ring fitted snugly in said bearing and closely around the rod, a resilient covering for each section, the outer ends of said coverings being flared, and terminating in annular lips and the inner ends of said coverings abutting.

12. The combination with a piston rod having an end head, of a piston composed of two end sections surrounding and completely enclosing and screwed to said head.

13. The combination with a piston rod having a head, of a metal piston fitted closely around and completely enclosing the head and screwed thereto.

14. The combination with a piston rod having an enlarged cylindrical head of a thin-walled cylindrical metal piston fitted closely about and completely enclosing the head and secured thereto.

15. The combination with a piston rod having an enlarged cylindrical head of a piston composed of two thin-walled, cylindrical end sections surrounding and completely enclosing the head and screwed thereto.

CRAWFORD K. STILLWAGON.